United States Patent
Miller et al.

(10) Patent No.: US 10,578,170 B2
(45) Date of Patent: Mar. 3, 2020

(54) LIVE CENTER VISCOUS CLUTCH

(71) Applicant: Horton, Inc., Roseville, MN (US)

(72) Inventors: Scott Miller, Edina, MN (US); Derek Savela, St. Paul, MN (US); Michael Stevens, St. Paul, MN (US)

(73) Assignee: HORTON, INC., Roseville, MN (US)

( * ) Notice: Subject to any disclaimer, the term of this patent is extended or adjusted under 35 U.S.C. 154(b) by 135 days.

(21) Appl. No.: 15/758,478

(22) PCT Filed: Oct. 4, 2016

(86) PCT No.: PCT/US2016/055258
§ 371 (c)(1),
(2) Date: Mar. 8, 2018

(87) PCT Pub. No.: WO2017/062328
PCT Pub. Date: Apr. 13, 2017

(65) Prior Publication Data
US 2018/0259009 A1    Sep. 13, 2018

Related U.S. Application Data (60) Provisional application No. 62/237,286, filed on Oct. 5, 2015.

(51) Int. Cl.
*F16D 35/02* (2006.01)
(52) U.S. Cl.
CPC .... *F16D 35/024* (2013.01); *F16D 2300/0212* (2013.01)
(58) Field of Classification Search
CPC .............................. F16D 35/021; F16D 35/025
See application file for complete search history.

(56) References Cited

U.S. PATENT DOCUMENTS

| 2,718,292 A | 9/1955 | Meilander |
| 3,211,136 A | 10/1965 | Burckhardt |

(Continued)

FOREIGN PATENT DOCUMENTS

| DE | 3941834 A1 | 6/1991 |
| DE | 19925132 A1 | 12/2000 |

(Continued)

OTHER PUBLICATIONS

Chinese Office Action issued in corresponding Chinese application No. 201680057783.4, dated Mar. 14, 2019.

(Continued)

*Primary Examiner* — Timothy Hannon
(74) *Attorney, Agent, or Firm* — Westman, Champlin & Koehler, P.A.

(57) ABSTRACT

A viscous clutch (20; 20') includes a rotor (26), a housing (24) that at least partially surrounds the rotor, a center shaft (22) rotationally fixed to the housing, a mounting disk (30) rotationally fixed to the rotor, a working chamber (38) defined between the rotor and the housing, a reservoir (36) for holding a supply of shear fluid, an electromagnet (34), a valve assembly (32) to selectively control flow of the shear fluid between the reservoir and the working chamber, and a flux guide (54) operatively positioned between the electromagnet and the armature. At least a portion of the mounting disk extends outside the housing. The valve assembly including an armature (32-3) that is selectively movable in response to magnetic flux generated by the electromagnet, and the magnetic flux is transmitted between the armature and the electromagnet along a flux circuit. The flux guide extends through the mounting disk.

26 Claims, 6 Drawing Sheets

(56) References Cited

U.S. PATENT DOCUMENTS

| | | |
|---|---|---|
| 3,272,188 A | 9/1966 | Sabat |
| 3,403,764 A | 10/1968 | Sutaruk |
| 3,444,748 A | 5/1969 | Sutaruk |
| 3,498,431 A | 3/1970 | Sutaruk |
| 3,752,279 A | 8/1973 | Briar |
| 3,921,772 A | 11/1975 | Hayashi |
| 4,013,154 A | 3/1977 | Brown |
| 4,046,239 A | 9/1977 | Tinholt |
| 4,134,484 A | 1/1979 | Lansinger |
| 4,169,693 A | 10/1979 | Brubaker |
| 4,231,457 A | 11/1980 | Cornish |
| 4,355,709 A | 10/1982 | Light |
| 4,526,257 A | 7/1985 | Mueller |
| 4,570,771 A | 2/1986 | Yamaguchi |
| 4,899,860 A | 2/1990 | Diederich |
| 4,903,805 A | 2/1990 | Ono |
| 4,930,458 A | 6/1990 | Takikawa et al. |
| 4,987,986 A | 1/1991 | Kennedy |
| 5,042,629 A | 8/1991 | Elmer |
| 5,101,950 A | 4/1992 | Schoenmeyer |
| 5,113,987 A | 5/1992 | Drennen et al. |
| 5,152,383 A | 10/1992 | Boyer et al. |
| 5,434,461 A | 7/1995 | Boggs, III |
| 5,446,327 A | 8/1995 | Boggs, III |
| 5,465,018 A | 11/1995 | Boggs, III |
| 5,511,643 A | 4/1996 | Brown |
| 5,555,963 A | 9/1996 | Martin |
| 5,558,192 A | 9/1996 | Muehlbach et al. |
| 5,627,422 A | 5/1997 | Boggs, III |
| 5,636,719 A | 6/1997 | Davis |
| 5,650,679 A | 7/1997 | Boggs, III |
| 5,722,523 A | 3/1998 | Martin |
| 5,778,843 A | 7/1998 | Inoue |
| 5,821,658 A | 10/1998 | Boggs, III |
| 5,855,265 A | 1/1999 | Kennedy |
| 5,896,971 A | 4/1999 | Hein |
| 5,992,594 A | 11/1999 | Herrle |
| 6,021,747 A | 2/2000 | Gee |
| 6,056,098 A | 5/2000 | Brown et al. |
| 6,073,593 A | 6/2000 | Nilson |
| 6,085,881 A | 7/2000 | Robb |
| 6,408,621 B1 | 6/2002 | Moser |
| 6,419,064 B1 | 7/2002 | Krammer |
| 6,443,283 B1 | 9/2002 | Augenstein |
| 6,481,390 B1 | 11/2002 | Robb |
| 6,523,657 B1 | 2/2003 | Kundermann |
| 6,530,462 B2 | 3/2003 | Lutz |
| 6,550,596 B2 | 4/2003 | Shiozaki |
| 6,695,113 B2 | 2/2004 | Lutz |
| 7,044,282 B2 | 5/2006 | Saunders, III |
| 7,083,032 B2 | 8/2006 | Boyer |
| 7,191,883 B2 | 3/2007 | Angermaier |
| 7,278,524 B2 | 10/2007 | Boyer |
| 7,686,146 B2 | 3/2010 | Taylor |
| 7,828,529 B2 | 11/2010 | Baumgartner |
| 7,854,307 B2 | 12/2010 | Hennessy |
| 7,886,886 B2 | 2/2011 | Schultheiss |
| 7,913,825 B2 | 3/2011 | Boyer |
| 7,913,826 B2 | 3/2011 | Boyer |
| 7,938,240 B2 | 5/2011 | Hennessy |
| 7,946,400 B2 | 5/2011 | Hennessy |
| 7,980,373 B2 | 7/2011 | Boyer |
| 8,100,241 B2 | 1/2012 | Hennessy |
| 8,186,494 B2 | 5/2012 | Boyer |
| 8,459,431 B2 | 6/2013 | Kandell |
| 8,596,438 B2 | 12/2013 | Boyer |
| 8,616,357 B2 | 12/2013 | Boyer |
| 8,636,127 B2 | 1/2014 | Schultheiss |
| 8,863,929 B2 | 10/2014 | Roczniak |
| 8,881,881 B2 | 11/2014 | Gevers |
| 8,887,888 B2 | 11/2014 | Hennessy |
| 9,239,086 B2 | 1/2016 | Kubota |
| 9,328,781 B2 | 5/2016 | Kubota |
| 2003/0230460 A1 | 12/2003 | Usui et al. |
| 2004/0084273 A1 | 5/2004 | May et al. |
| 2005/0045443 A1 | 3/2005 | Tilly |
| 2007/0205071 A1 | 9/2007 | Light |
| 2010/0025177 A1 | 2/2010 | Fukushima et al. |
| 2011/0229323 A1 | 9/2011 | Roby |
| 2012/0164002 A1 | 6/2012 | Roczniak |
| 2014/0216881 A1 | 8/2014 | Tilly |
| 2015/0240888 A1 | 8/2015 | Schmidt |

FOREIGN PATENT DOCUMENTS

| | | |
|---|---|---|
| EP | 1418361 A2 | 5/2004 |
| GB | 2087048 A | 5/1982 |
| JP | 2002180832 A | 6/2002 |
| WO | WO2005098256 A2 | 10/2005 |
| WO | WO2011019527 A2 | 6/2011 |
| WO | WO2014047430 A1 | 3/2014 |
| WO | WO2014159374 A1 | 10/2014 |

OTHER PUBLICATIONS

Chinese Office Action issued in corresponding Chinese application No. 201680057895.X, dated Mar. 13, 2019.

Extended European Search Report issued in Corresponding European Patent Application No. EP16854152, dated Feb. 4, 2019.

International Search Report and Written Opinion of the International Search Authority dated Jan. 11, 2017, for corresponding International Application PCT/US2016/055258 filed Oct. 4, 2016.

Chinese Office Action issued in corresponding Chinese application No. 201680070513.7, dated Sep. 27, 2019.

Chinese Office Action issued in corresponding Chinese application No. 201680070513.7, dated Jun. 19, 2019.

Extended European Search Report dated May 29, 2019, in corresponding European patent application No. EP16854150.

Supplementary European Search Report issued in Corresponding European Patent Application No. EP16871598, dated Jul. 29, 2019.

LIVE CENTER VISCOUS CLUTCH

BACKGROUND

The present invention relates generally to clutches, and more particularly to viscous clutches.

Viscous clutches are used in a wide variety of applications, such as for automotive fan drive applications. These clutches typically employ relatively thick silicone oil (more generally called shear fluid or viscous fluid) for the selective transmission of torque between two rotatable components. Engage or disengagement the clutch is made possible by selectively allowing the oil into and out of a working area of the clutch located between input and output members (e.g., between a rotor and a housing) where a viscous shear coupling can be created by the oil to transmit torque from the input member to the output member. A valve is used to control the flow of the oil into and/or out of the working area. Some recent clutch designs allow the oil to be stored in a reservoir attached to an input rotor (located inside the housing and generally accepting a torque input at all times) while the clutch is disengaged, in order to keep kinetic energy available in the oil to allow rapid engagement of an outer output housing of the clutch from the disengaged/off condition, and to allow the clutch to have a very low output speed (e.g., fan speed) while the valve is positioned to obstruct oil flow into the working area. However, attachment of the reservoir to the rotor disk substantially limits design flexibility. For instance, many prior art viscous clutches have limitations associated with magnetic flux circuits used for control of the valve, and positioning a valve relative to a rotating reservoir while still providing suitable fluid and flux paths presents formidable challenges. These constraints typically apply while designers also still seek to provide a relatively compact and low-mass clutch package that can accommodate desired torque loads and also function quickly, efficiently and reliably.

Therefore, it is desired to provide an alternative viscous clutch.

SUMMARY

In one aspect, a viscous clutch according to the present invention includes a rotor, a housing that at least partially surrounds the rotor, a center shaft rotationally fixed to the housing, a mounting disk rotationally fixed to the rotor, a working chamber defined between the rotor and the housing, a reservoir for holding a supply of shear fluid, an electromagnet, a valve assembly to selectively control flow of the shear fluid between the reservoir and the working chamber, and a flux guide operatively positioned between the electromagnet and the armature. At least a portion of the mounting disk extends outside the housing. The valve assembly including an armature that is selectively movable in response to magnetic flux generated by the electromagnet, and the magnetic flux is transmitted between the armature and the electromagnet along a flux circuit. The flux guide extends through the mounting disk.

The present summary is provided only by way of example, and not limitation. Other aspects of the present invention will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

In general, the present invention relates to viscous clutches. In one aspect, the present invention provides a viscous clutch having a live shaft and a reservoir in an input housing, which can help provide improved heat dissipation during operation. The viscous clutch can further include an external mounting disk that is secured to the rotor, which co-rotates at the same speed as the rotor and allows for mounting of an output device (e.g., a fan). A hub piece can be provided to fixedly couple the rotor and the mounting disk. An electromagnetically controlled valve assembly that governs operation of the viscous clutch can include a flux circuit that traverses the mounting disk. Portions of the flux circuit can travel through magnetic flux-conducting material of a portion of the hub and/or through a flux guide inserted through the mounting disk. A clutch according to the present invention provides numerous advantages and benefits, such as providing an input-based reservoir to facilitate clutch actuation response time, allowing reservoir positioning close to external surfaces for improved heat dissipation, reducing or minimizing the number of separate bearing sets, and providing a relatively compact flux circuit and valve assembly electromagnet. Numerous other features and benefits will be appreciated by those of ordinary skill in the art in view of the entirety of the present disclosure, including the accompanying figures.

The present application claims priority to U.S. Provisional Patent App. Ser. No. 62/237,286, filed Oct. 5, 2015, which is hereby incorporated by reference in its entirety.

Figure 1:
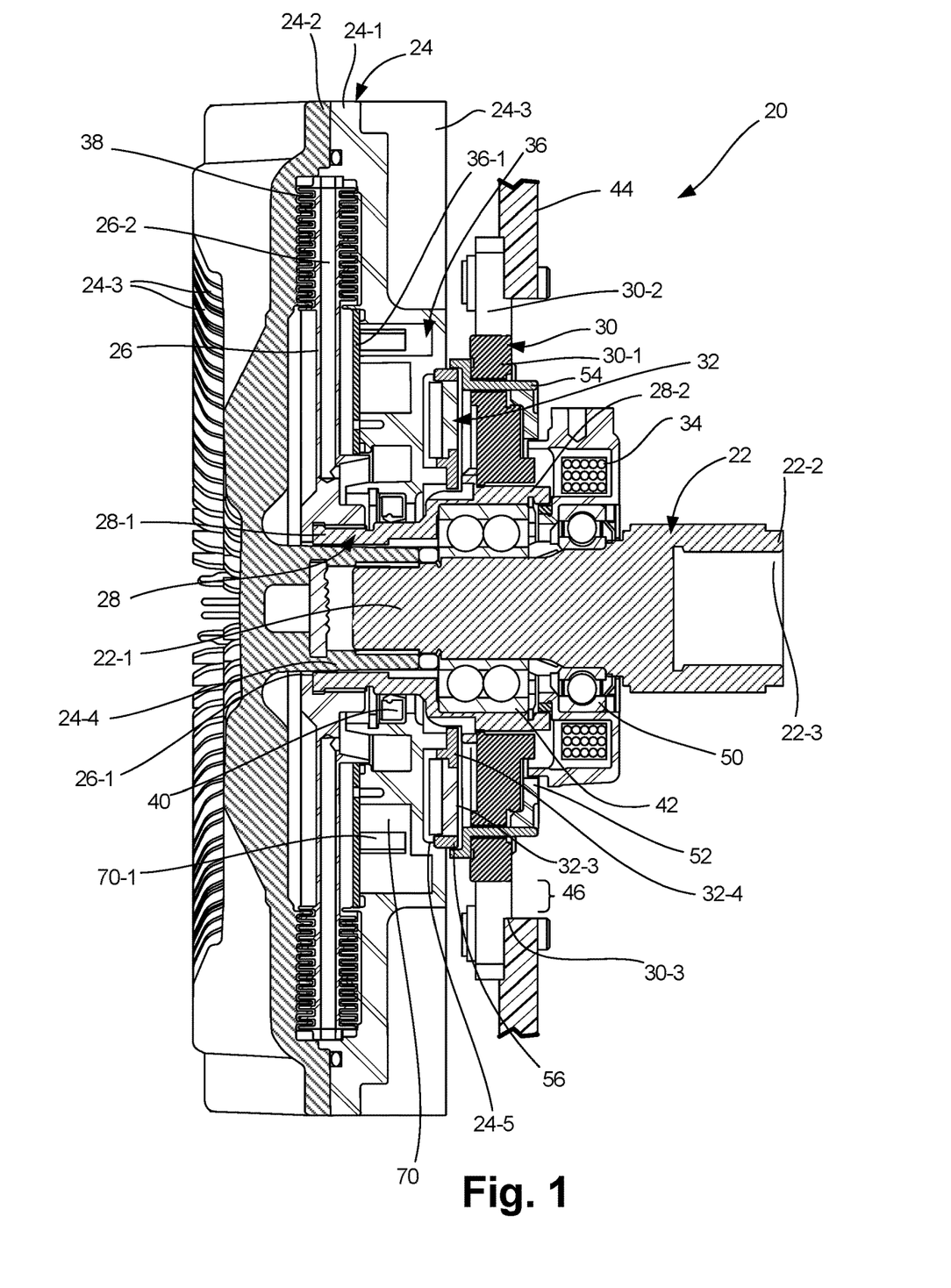
FIG. 1 is a cross-sectional view of an embodiment of a viscous clutch according to the present invention.

FIG. 1 is a cross-sectional view of an embodiment of a viscous clutch 20 that includes a shaft 22, a multi-part housing (or housing assembly) 24, a rotor 26, a hub 28, a mounting disk 30, a valve assembly 32 (only partly visible in FIG. 1), an electromagnet 34, a reservoir 36, and a working chamber 38.

The shaft 22 is a "live" center shaft, meaning that the shaft 22 is rotatable and is located at a center of the clutch 20 defined by an axis of rotation. The shaft 22 extends axially through at least part of the housing 24, and is rotatably fixed to the housing 24 at or near a front face of the housing 24. In the illustrated embodiment, a first end 22-1 of the shaft 22 extends forwardly at least partly into the housing 24 and an opposite second end 22-2 of the shaft extends axially outward from a rear face of the housing 24. The shaft 22 can act as a primary structural support for the entire clutch 20, which is to say that mass of the clutch 20 can be supported primarily (or entirely) by the shaft 22. The shaft 22 can include at least one fastening feature 22-3 that can be connected to a torque input, such as a driveshaft of an engine (not shown), so that the shaft 22 accepts an input torque and acts as a driving or input member for the clutch 20. In the illustrated embodiment, the fastening feature 22-3 includes an internal thread and external wrench attachment flats, though in alternative embodiments an external thread, attachment flange, or other suitable attachment feature(s) can be utilized as desired for particular applications. While the illustrated embodiment depicts the shaft 22 as essentially solid, the shaft 22 can be hollow or otherwise have one or more internal passageways or cavities in alternative embodiments.

The housing 24 includes a base 24-1 and a cover 24-2 secured to each other in a rotationally fixed manner. The housing 24 can be made of aluminum or another suitable material. Cooling fins 24-3 can be provided on external surfaces of the housing 24, on the base 24-1 and/or the cover 24-2, to facilitate heat dissipation to ambient air. One or more seals 40 can also be provided along the housing 24 (e.g., between the base 24-1 and the hub 28) to help retain a shear fluid within the clutch 20. Because the housing 24 is rotationally fixed to the shaft 22, the housing 24 rotates whenever the shaft 22 rotates. When the shaft 22 accepts torque input to the clutch 20, the housing 24 rotates at an input speed as a function of a torque input to the shaft 22, with both the housing 24 and the shaft 22 rotating whenever there is torque input to the clutch 20. In that way, the cooling fins 24-3 can rotate with the housing 24 at the input speed whenever input torque is provided to the clutch 20, which helps enhance heat dissipation as compared to having fins on an output member that rotates only when the clutch is engaged.

In the illustrated embodiment, the first end 22-1 of the shaft 22 is affixed to a center sleeve (or hub) 24-4 of the cover 24-2 (e.g., with a threaded, press-fit, or other suitable coupling), and the base 24-1 is indirectly supported on the shaft 22 by the cover 24-2. In this way the base 24-1 has a cantilevered or semi-cantilevered configuration, without any bearing set to rotationally support the housing 24 upon other components of the clutch 20. More specifically, in the illustrated embodiment the clutch 20 does not include any bearing set between the housing 24 and any or all of the rotor 26, the hub 28 or the mounting disk 30, though such an additional bearing set could optionally be provided in alternative embodiments. It should be noted that the center sleeve 24-4 could be omitted in alternatively embodiments, and the shaft 22 extended in the axial direction to connect to the cover 24-2 or an additional coupling structure added between the housing 24 and the shaft 22 to create a rotationally fixed coupling with the housing 24.

The rotor 26 is positioned at least partially within the housing 24, and preferably entirely within the housing 24, and can have a disc-like shape with a central opening 26-1. The rotor 26 can be made of aluminum or another suitable material. When the shaft 22 and the housing 24 act as torque input members of the clutch 20, the rotor 26 (together with the hub 28 and the mounting disk 30) acts as a torque output member. The shaft 22 and/or the sleeve 24-4 of the housing 24 can pass through the central opening 26-1 in the rotor 26, separated by a small radial gap, allowing transmission of torque from the shaft 22 to the housing 24 along a torque transmission path that passes through the central opening 26-1 and axially across the rotor 26 independent of viscous engagement of the clutch 20 and at a location spaced from, and independent from, the working chamber 38. The torque transmission path can be a direct (i.e., fixed, slipless or otherwise permanently coupled) torque transmission path.

The working chamber 38 is defined (and operatively positioned) between the rotor 26 and the housing 24. The working chamber 38 can extend to both sides of the rotor 26. As explained further below, selective introduction of a shear fluid to the working chamber 38 can engage the clutch 20 by creating a viscous shear coupling to transmit torque between the housing 24 and rotor 26, with the degree of torque transmission (and associated output slip speed) being variable a function of the volume of shear fluid present in the working chamber 38. Concentric annular ribs, grooves and/or other suitable structures can be provided on the rotor 26 and housing 24 to increase surface area along the working chamber 38 and promote a shear coupling when the shear fluid is present in the working chamber 38, as is known in the art. The rotor 26 can further include a fluid return bore 26-2 that extends generally radially from the working chamber 38 to the reservoir 36, as explained further below.

The hub 28 is a generally axially-extending, sleeve-like member that can serve multiple functions, including providing structural support for various clutch components, a torque transmission path, and part of a magnetic flux circuit. The rotor 26 is rotationally fixed to the hub 28, and the hub 28 is further rotationally fixed to the mounting disk 30, which can act as an output of the clutch 20. The hub 28 can be affixed to the rotor 26 at or near the central opening 26-1. Additionally, the hub 28 can be rotationally supported on the shaft 22 by a bearing set 42. In the illustrated embodiment, the hub 28 surrounds the first end 22-1 of the shaft 22 and the center sleeve 24-4 of the housing 24, separated by a small radial gap. Moreover, in the illustrated embodiment, the hub 28 has a stepped configuration, with one or more steps in diameter, to provide a forward end 28-1 that has a smaller diameter than an opposite rear end 28-2. The bearing set 42 is configured as a double-row bearing set in the illustrated embodiment and is positioned in direct contact with the shaft 22 and the rear end 28-2 of the hub 28 at a location axially rearward of the housing 24, with the stepped configuration of the hub 28 helping to accommodate the bearing set 42 in the radial dimension. The bearing set 42 can be aligned with the mounting disk 30 in the axial direction. The location of the bearing set 42 allows the hub 28 to support the rotor 26 relative to the shaft and housing 24 (especially the sleeve 24-4) in a cantilevered configuration. Thus, in the illustrated embodiment, there is no bearing set directly aligned with the rotor 26 or the front end 28-1 of the hub 28. However, alignment of the bearing set 42 with the mounting disk 30 still allows relatively high output loads upon the bearing set 42 to be balanced, thereby helping to prolong bearing life. It should be noted that the particular configuration of the hub 28 shown in the drawings and described above is provided merely by way of example, and not limitation. For instance, a portion of the hub 30 could be integrated with the rotor 26 or have a different (e.g., non-stepped) shape in further embodiments, and an additional bearing set can optionally be provided proximate to the rotor 26. The hub 28 can be made of a suitable magnetic flux-conducting material, such as a ferromagnetic material like steel, in order to serve as part of a flux circuit, as explained further below.

The mounting disk 30 is rotationally fixed to the hub 28, which provides a rotational coupling (e.g., a fixed or direct rotational torque coupling) between the rotor 26 and the mounting disk 30, enabling the mounting disk 30 to co-rotate at the same speed as the rotor 26 (e.g., at the output slip speed). An output device 44, such as a fan, can be connected and rotationally fixed to the mounting disk 30. The mounting disk 30 can be positioned at or near a rear face of the housing 24, and at least a portion of the mounting disk 30 extends outside the housing 24. Such a configuration allows for a rear mount of the output device 44, and, in an embodiment where the output device 44 is a fan, allows the fan to be positioned behind the clutch 20 (i.e., between the clutch 20 and the location where the live shaft 22 is mounted). In the illustrated embodiment, the mounting disk 30 is arranged substantially parallel to the rotor 26 and is separated from the rotor 28 by the base 24-1 of the housing 24, such that the mounting disk 30 is located between the electromagnet 34 and the housing 24. In other words, the rotor 26 and the mounting disk 30 can each be aligned with planes that are parallel to each other and axially spaced apart. The mounting disk 30 can also be located axially in between the valve assembly 32 and the electromagnet 34. Furthermore, the rear end 28-2 of the hub 28 can extend axially rearward of the mounting disk 30, to facilitate magnetic flux transmission as explained further below.

Figure 2:
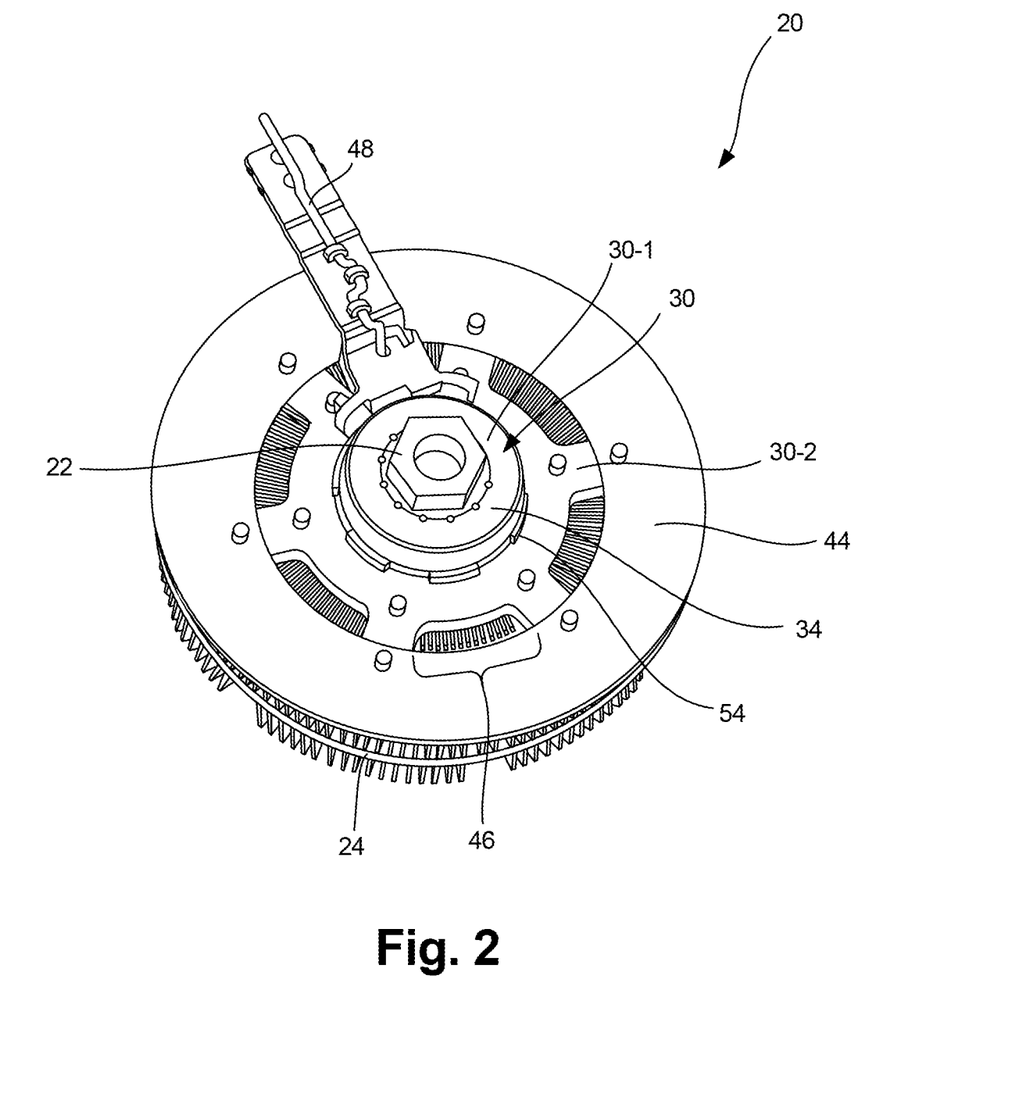
FIG. 2 is a rear perspective view of the viscous clutch of FIG. 1.

FIG. 2 is a rear perspective view of the viscous clutch 20 and the attached output device 44 (illustrated as an annular hub for a fan, though the fan blades are not shown, for simplicity). In the illustrated embodiment, the mounting disk 30 has a body portion 30-1 and multiple arms 30-2. The body portion 30-1 can be annular and located radially inwardly, while the arms 30-2 can extend radially outwardly from the body portion 30-1. The arms 30-2 are spider-like extensions that are spaced from each other, such as in an equal circumferential spacing pattern. Each of the arms 30-2 can be notched, such that a distal end is thinner than a radially inward portion, thereby creating a pilot 30-3 to facilitate attachment of the output device 44. Suitable fastener openings can be provided in the arms 30-2 and/or in the body portion 30-1 to accept fasteners used to secure the output device 44. The mounting disk 30 can be made of aluminum, or other suitable materials. However, in a preferred embodiment, the mounting disk 30 is not made from a ferromagnetic material, to avoid disruption of the magnetic flux circuit of the clutch 20.

In some embodiments, one or more vents 46 can be provided between the mounting disk 30 and the output device 44. As shown in FIGS. 1 and 2, the vents 46 can be provided between adjacent arms 30-2 and between the body portion 30-1 and an inner edge of the output device 44 (which can align with the pilot 30-3 in at least some applications). In the illustrated embodiment, the vents 46 are formed at least in part by scallops located in between the circumferentially-spaced arms 30-2 of the mounting disk 30, and the output device 44 has an inner diameter that is larger than a diameter of an inner portion of the mounting disk scallops. The vents 46 can improve ambient air circulation around the clutch 20, and, more particularly, can facilitate airflow axially across the location of the mounting disk 30 and the output device 44. For instance, the vents 46 can be located at a common radial position with the reservoir 36, near an inner diameter of the base 24-1 of the housing 24, to facilitate heat dissipation from the shear fluid present in the reservoir 36 and to provide enhanced airflow along a substantial (or entire) radial length of the cooling fins 24-6. Alternatively, a radially inner portion of the output device 44 can have scallops, notches, etc. (not shown) to form the vents 46. The mounting disk 30 can be made (e.g., cast) as one piece, or, in alternative embodiments, can be a multi-piece assembly. Furthermore, the mounting disk 30 can carry one or more targets for a speed sensor (not shown), to facilitate sensing the output speed of the clutch 20.

As shown in FIGS. 1 and 2, the electromagnet 34 is provided that allows control of the valve assembly 32 and, in turn, the degree of engagement of the clutch 20, by selectively energizing the electromagnet 34 to generate magnetic flux. In the illustrated embodiment, the electromagnet 34 is an electromagnetic coil (or solenoid) positioned to encircle a portion of the shaft 22 at the rear side of the clutch 20. More specifically, the electromagnet 34 can be positioned in between the mounting disk 30 and the second end 22-2 of the shaft 22. The coil forming the electromagnet 34 can have turns of wire potted within a magnetically flux-conductive housing, in a manner known in the art. As shown in FIG. 2, a wire connection assembly 48 to a power source and electronic controller, including a tether, bracket or other suitable device to rotationally fix the electromagnet 34, can also be provided at a rear side of the clutch 20, rearward of the mounting disk 30 (and the output device 44). A bearing set 50 can be provided to rotatably mount the electromagnet 34 upon the shaft 22. Because the electromagnet 34 mounts to the shaft 22 only via the bearing set 50, the electromagnet 34 can be relatively small, which helps reduce the overall mass of the clutch 20.

Figure 3:
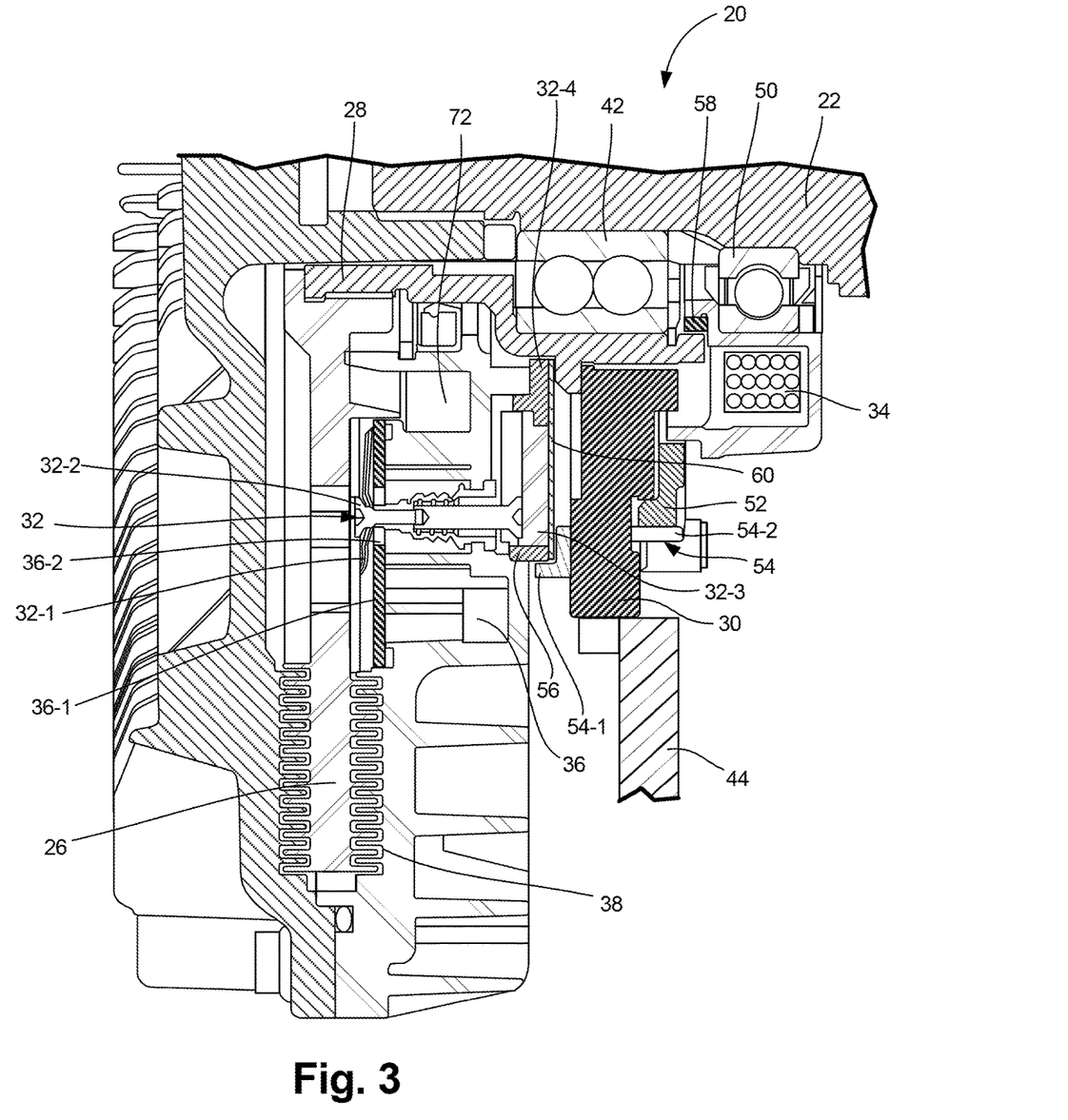
FIG. 3 is another cross-sectional view of a portion of the viscous clutch of FIG. 1, taken at a different sectional plane, showing a valve assembly.

FIG. 3 is another cross-sectional view of a portion of the viscous clutch 20, taken at a different sectional plane than FIG. 1, which shows the valve assembly 32 in greater detail (the section plane of FIG. 1 does not pass through all of the components of the valve assembly 32). The output device 44 is not shown in FIG. 3 for simplicity. The output (e.g., the rotor 26, the hub 28 and the mounting disk 30) of the clutch 20 can be selectively engaged relative to the input (e.g., the shaft 22 and the housing 24) at a desired slip speed by controlling the volume of the shear fluid present in the working chamber 38 using the valve assembly 32, which can be controlled by selectively energizing the electromagnet 34. The valve assembly 32 can be mounted to the housing 24, and, more specifically, can be mounted to the base 24-1. In one embodiment, the valve assembly 32 includes a valve element 32-1, a control rod 32-2, and an armature 32-3. A stop 32-4, to limit travel of the armature 32-3, can also be provided. The stop 32-4 can be made of a magnetic flux-conducting material to also transmit magnetic flux. A pocket (or recess) 24-5 can be provided in the housing 24 (e.g., in an exterior of the base 24-2) to accommodate and protect components of the valve assembly 32, such as the armature 32-3.

During operation, magnetic flux from the electromagnet 34 can move (e.g., translate) the armature 32-3, which in turn moves (e.g., translates) the control rod 32-2, which in turn moves (e.g., pivots) the valve element 32-1. The valve element 32-1 can limit or prevent flow of the shear fluid out of the reservoir 36 when in a closed position. In some embodiments, the valve element 32-1 can be mechanically biased to an open position by default, with energization of the electromagnet 34 causing the valve element 32-1 to move to the closed position. For instance, the valve assembly 32 can include a biasing element (e.g., leaf spring) to mechanically bias the valve element 32-1 to a desired position (e.g., an open position) by default when the electromagnet 34 is de-energized. In the illustrated embodiment, the valve element 32-1 includes an integral leaf spring portion, though in alternative embodiments a separate biasing element can be provided, such as a separate spring that engages armature 32-3, the control rod 32-2 or the valve element 32-1. In one embodiment, actuation of the valve assembly 32 can be similar to that described in commonly-assigned PCT Patent Application Pub. No. WO2014/047430A1. However, it should be noted that the particular configuration of the valve assembly 32 disclosed herein is provided merely by way of example and not limitation. Numerous other types of valve configurations can be utilized in alternative embodiments, such as valves with pivoting or rotating elements, as well as valves that selectively cover the fluid return bore 26-2.

Figure 4:
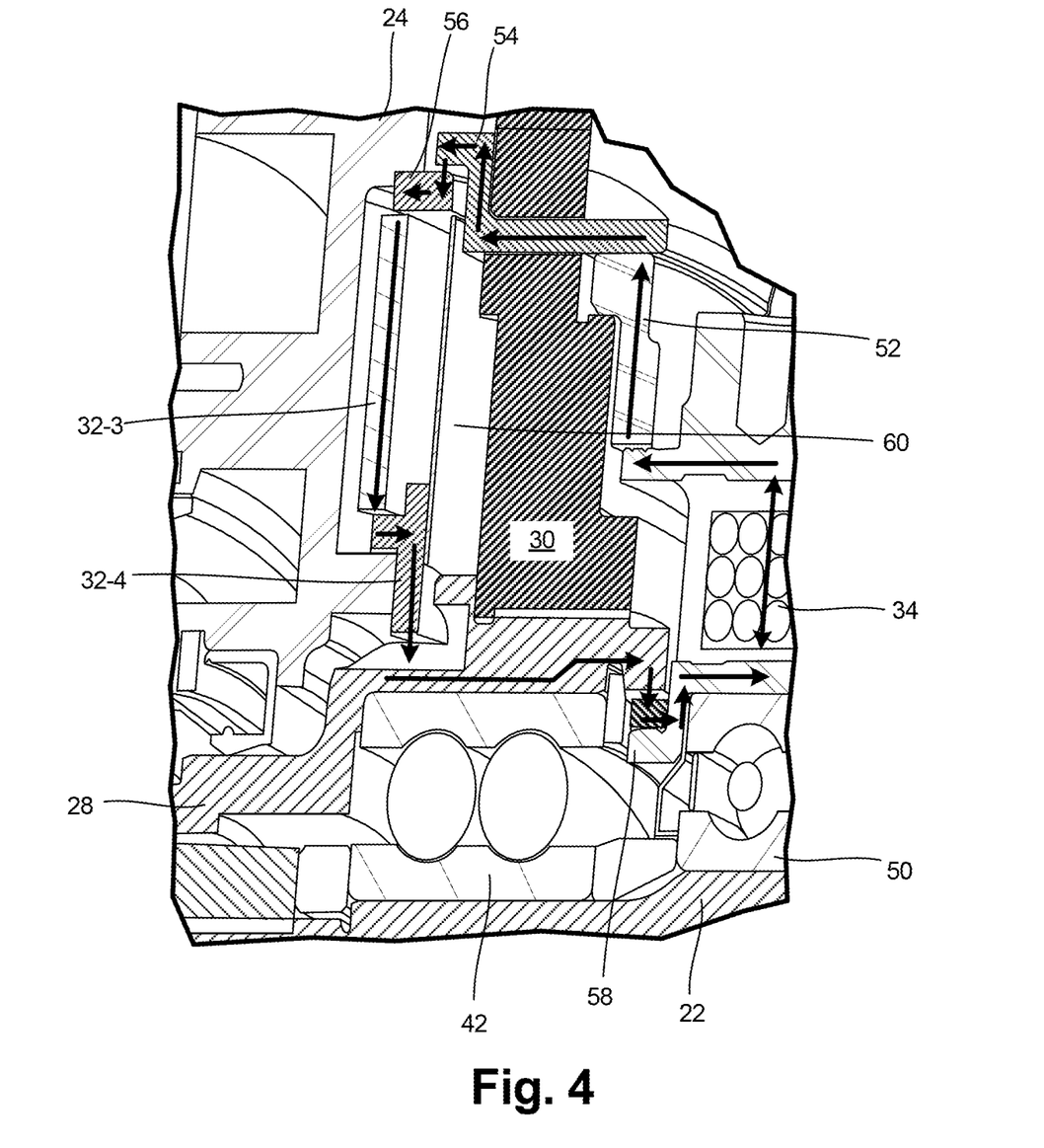
FIG. 4 is a cross-sectional view of a portion of the clutch 20 that schematically illustrates the flux circuit

In order to transmit magnetic flux from the electromagnet 34 to the armature 32-3 of the valve assembly 32, and then back to the electromagnet 34, a magnetic flux circuit is provided by the clutch 20. FIG. 4 is a cross-sectional perspective view of a portion of the clutch 20 that schematically illustrates the flux circuit, with arrows indicating the path followed by magnetic flux transmitted along the flux circuit. It should be noted that FIG. 4 depicts the armature 32-3 in a position in which the valve assembly 32 is "open," whereas FIG. 3 depicts the armature 32-3 in another position in which the valve assembly 32 is "closed."

As shown in FIGS. 1, 3 and 4, the entire flux circuit can be located generally outward of the bearing sets 42 and 50, which is to say that when viewed in cross section the bearing sets 42 and 50 are each located radially inward of the path traced by the flux circuit and the bearing sets 42 and 50 are not enclosed within the flux circuit (although portions of the flux circuit may extend radially inward from outermost radial positions of either of the bearing sets 42 and 50). In the illustrated embodiment, the flux circuit begins at the electromagnet 34 and travels through flux guides 52, 54 and 56, then to the armature 32-3 and the stop 32-4, then through a portion of the hub 28 followed by another flux guide 58, and finally back to the electromagnet 34. Magnetic flux is generally conducted through only a portion of the hub 28, such as the rear end 28-2, and the flux-transmitting portion of the hub 28 axially traverses the mounting disk 28. In alternative embodiments, some of the flux-conducting components in the flux circuit can be integrated, rather than being separate and distinct parts, and some components (such as certain flux guides) can even be omitted in alternative embodiments.

The flux circuit transverses numerous air gaps, which are present between components of the clutch 20 that can rotate relative to one another. A first flux circuit air gap between the electromagnet 34 and the flux guide 52 can be arranged substantially radially. An axially-extending outer lip on the magnetically flux-conductive housing of the electromagnet 34 can help allow the first flux circuit air gap to be substantially radial. The flux guides 52 and 54 can be in contact with each other, such that no air gap is present between them. A second flux circuit air gap between the flux guides 54 and 56 and a third flux circuit air gap between the flux guide 56 and the armature 32-3 can each be arranged substantially radially. A fourth flux circuit air gap between the armature 32-3 and the stop 32-4 can also be arranged substantially radially; however, when the electromagnet 34 is energized and the armature 32-3 moves to a maximum extent in contact with the stop 32-4, the fourth flux circuit air gap in essence disappears due to the direct physical contact between those parts. A fifth flux circuit air gap between the stop 32-4 and the hub 28 can also be arranged substantially radially. Lastly, a sixth flux circuit air gap between the rear end 28-2 of the hub 28 and the flux guide 58 can be arranged substantially radially. The flux guide 58, which can also function to help physically secure the electromagnet 34 and the associated bearing set 50 on the shaft 22, can be indirect physical contact with a portion of the electromagnet 34, such that no air gap is present between those parts. A stepped, axially-extending inner lip on the magnetically flux-conductive housing of the electromagnet 34 can help create a space for the flux guide 58, and can help allow the sixth flux circuit air gap to be substantially radial. Having most or all of the flux circuit air gaps oriented radially helps promote efficient flux transmission, and radial flux circuit air gaps are generally preferred over axial flux circuit air gaps. In general it is desired to have all of the air gaps be as small as possible.

The flux guides 52, 54, 56 and 58 can each be made of a suitable magnetic flux-conducting material, preferably a ferromagnetic material (e.g., steel). Use of the flux guides 52-58 facilitates the use of highly thermally conductive materials like aluminum for certain components of the clutch 20, which is not a good magnetic flux conductor, while still permitting suitable magnetic flux transmission for operation of the clutch 20. Moreover, by using discrete flux guides and other discrete magnetic flux-conducting components (that may also perform other functions besides flux transmission), which can be surrounded by non-magnetic flux-conducting materials (or less efficient magnetic flux conductors), the flux circuit can provide a relatively well-defined and efficient flux transmission path that reduces undesired effects like eddy currents or flux path short circuits.

The flux guide 52 is located along a rear face of the mounting disk 30 in the illustrated embodiment, and in particular along a rear face of the body portion 30-1. The flux guide 52 extends generally radially, and can have a stepped shape to mate with the mounting disk 30. The flux guide 52 can be rotationally fixed to the mounting disk 30. The first flux circuit air gap separates the flux guide 52 and the electromagnet 34.

The flux guide 54 is mounted to, or embedded in, the mounting disk 30, and can pass entirely through the mounting disk 30 between opposite front and rear faces of the mounting disk 30 at a position radially spaced outward from the hub 28 and the shaft 22, as well as radially outward from the electromagnet 34. For instance, the flux guide 54 can be an insert embedded in the mounting disk 30 during a casting process. At least a portion of the flux guide 58 can be located radially outward from the armature 32-3 and the flux guide 56. The flux guide 54 is rotationally fixed to the mounting disk 30. In the illustrated embodiment, the flux guide 54 includes an annular section 54-1 and one or more tabs 54-2. The annular section 54-1 can be located at a front side of the mounting disk 30, with a radially extending portion and an axially extending portion that protrudes forward from the mounting disk 30. The tabs 54-2 can extend axially (e.g., rearward) from the annular section 54-1 (e.g., from the radially extending portion of the annular section 54-1), and can protrude from the rear face of the mounting disk 30. Any desired number of the tabs 54-2 can be provided, and when there are multiple tabs 54-2 they can be equally spaced in a circumferential direction. The tabs 54-2 can physically contact the flux guide 52, or alternatively can be separated by as small a radial air gap as possible.

The flux guide 56 can be rotationally fixed to the housing 24, and more particularly to the base 24-1 at or near the pocket 24-5. In the illustrated embodiment, the flux guide 56 is located at a radially outward portion of a perimeter of the pocket 24-5. The flux guide 56 is positioned adjacent to the flux guide 54, and the flux guide 56 is separated from the flux guide 54 by the second flux circuit air gap. Moreover, the flux guide 56 is also positioned adjacent to the armature 32-3, and the flux guide 56 is separated from the armature 32-3 by the third flux circuit air gap. In the illustrated embodiment, the flux guide 56 is positioned radially in between the armature 32-3 and the annular portion 54-1 of the flux guide 54, and the flux guide 56 axially overlaps part of the annular portion 54-1.

The armature 32-3 can be a plate-like piece able to translate in the axial direction. The armature 32-3 can be positioned at or within the pocket 24-5. In the illustrated embodiment, the stop 32-4 is generally T-shaped, with an axially forwardly extending portion that can pass through a central opening in the armature 32-3 and a radially outwardly extending portion that abuts the armature 32-3 and arrests motion of the armature 32-3 when the electromagnet 34 is energized to move the armature 32-3 to the "closed" position. The fourth flux circuit air gap separates the armature 32-3 and the stop 32-4 in some conditions, though the fourth flux circuit air gap essentially disappears when the armature 32-3 is brought into physical contact with the stop 32-4 due to magnetic attraction when the electromagnet 34 is energized. In some embodiments, the armature 32-3 can axially overall at least a portion of the stop 32-4 (e.g., the axially forwardly extending portion of the stop 32-4) in all positions, to facilitate flux transmission.

Additionally, the clutch 20 can include barrier 60. Because the armature 32-3 is located at an exterior of the clutch 20, and is exposed to the environment in between the housing 24 and the mounting disk 30, there is a need to protect the armature 32-3 from debris. Armature debris protection can be accomplished by arranging the barrier 60 along the pocket 24-5 in the housing 24, to function as a debris shield. The barrier 60 should be non-magnetic to avoid influencing actuation of the armature 32-3, and to help avoid generating any undesirable eddy currents, which would reduce reaction time of the magnetically actuated armature 32-3. In the illustrated embodiment shown in FIGS. 1, 3 and 4, the barrier 60 is a generally planar disc carried by and rotatably fixed relative to the housing 24 that abuts the stop 32-4 and extends to the flux guide 56 at a rear side of the armature 32-3.

As already noted, the valve assembly 32 selectively controls flow of the shear fluid between the reservoir 36 and the working chamber 38. The reservoir 36 can be provided on or within the housing 24, and more particularly in the base 24-1 of the housing 24, and a wall 36-1 of the reservoir 36 can be attached to and carried by the housing 24 to form a boundary to help retain the shear fluid and to separate the reservoir 36 from other portions of the clutch 20. The wall 36-1 can be located in an interior of the clutch 20, and can be arranged to face the rotor 26. The shear fluid can be stored in the reservoir 36 when not needed for engagement of the clutch 20. In the illustrated embodiment, the reservoir 36 is carried by the housing 24, such that the reservoir 36 and shear fluid contained within both rotate with the housing 24. In this way, when the shaft 22 and the housing 24 acts as an input to the clutch 20, the reservoir 36 rotates at input speed whenever there is a torque input to the clutch 20, which imparts kinetic energy to the shear fluid in the housing-carried reservoir 36 to facilitate relatively quick clutch engagement response times. Furthermore, because the reservoir 36 is carried by the housing 24, which is an exterior component of the clutch 20, the reservoir 36 and the shear fluid contained therein are located in close physical proximity to the both ambient air and the fins 24-3, which facilitates heat dissipation as compared to clutches having a reservoir on or carried by interior clutch components (like the rotor).

Figure 5:
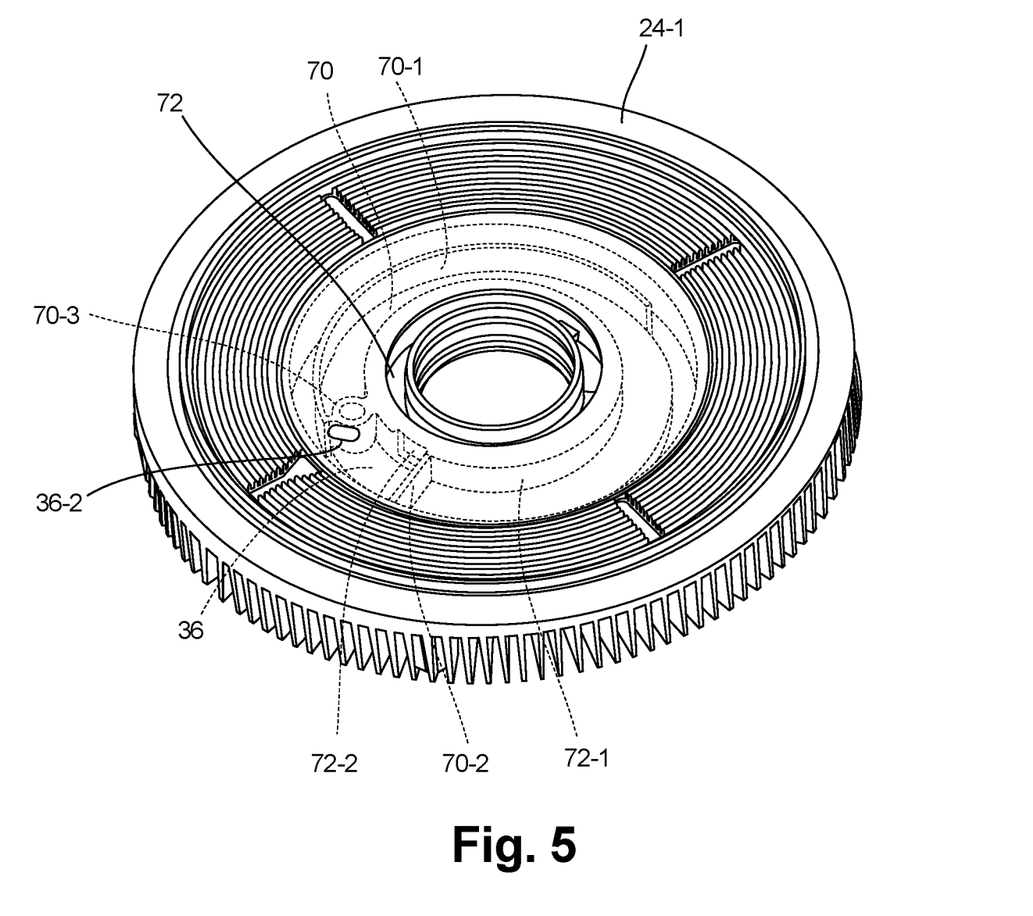
FIG. 5 is a perspective view of a housing base and reservoir for the viscous clutch, shown in isolation.

FIG. 5 is a perspective view of a portion of the clutch 20, including the base 24-1 of the housing 24 and the reservoir 36, shown in isolation. As shown in FIG. 5, an outlet port 36-2 is formed along a boundary of the reservoir 36 to allow the shear fluid to leave the reservoir 36 for delivery to the working chamber 38. In the illustrated embodiment the outlet port 36-2 is formed in the wall 36-1. The outlet port 36-2 is selectively covered and uncovered by the valve element 32-1 of the valve assembly 32, which governs how much of the shear fluid can flow out of the reservoir 36 and to the working chamber 38 and thereby control the slip speed of the clutch 20.

During operation of the clutch 20, the shear fluid can be continually pumped from the working chamber 38 back to the reservoir 36 through the return bore 26-2. The return bore passes through the rotor 26 in the illustrated embodiment, but in alternative embodiments could be in the housing 24 (e.g., the cover 24-2). A dam or baffle can be positioned adjacent to the return bore 26-2 in the working chamber 38 to facilitate pumping the shear fluid back to the reservoir 36, in a manner well-known in the art.

Another aspect of the present invention involves features to help reduce or prevent so-called "morning sickness" when a clutch receives a rotational input after a period of inactivity. "Morning sickness" relates to shear fluid draining back to the working chamber while idle (i.e., without any input torque), such that the clutch engages briefly before the shear fluid can be pumped back to the reservoir upon receipt of an input torque. It is desirable for the viscous clutch 20 to retain fluid in the reservoir 36 or otherwise away from the working chamber 38 when the clutch 20 is not used for an extended period of time.

An accumulator chamber 70 can be defined within the reservoir 36 by an arcuate wall 70-1 that extends over less than 360° (e.g., approximately 180°). Further walls 70-2 and 70-3 can be provided that radially span the reservoir 36 to block shear fluid flow within the reservoir 36, such as at or near opposite ends of the arcuate wall 70-1. At least a portion of the shear fluid can be retained in the accumulator chamber 70 when the clutch 20 is idle to help reduce morning sickness.

Another accumulator chamber 72 can be defined radially inward of the reservoir 36, and separated from the reservoir 36 by a wall 72-1 (e.g., a circumferential wall). The return bore 26-1 can deliver the shear fluid from the working chamber 38 to the accumulator chamber 72, which can have a single radially-oriented port 72-2 in the wall 72-1 that allows the shear fluid to flow from the accumulator chamber 72 to the reservoir 36. At least a portion of the shear fluid can be retained in the accumulator chamber 72 when the clutch 20 is idle to help reduce morning sickness. It should be noted that the accumulator chamber 72 can be utilized without the accumulator chamber 70 in further embodiments, or without either accumulator chamber 70 or 72.

In alternative embodiments, the clutch 20 can include an anti-drainback or morning sickness prevention valve like that disclosed in U.S. Provisional Patent App. Ser. No. 62/237,286, and/or can include an anti-drainback accumulator wall and bore assembly like that disclosed in U.S. Provisional Patent App. Ser. No. 62/262,565.

Figure 6:
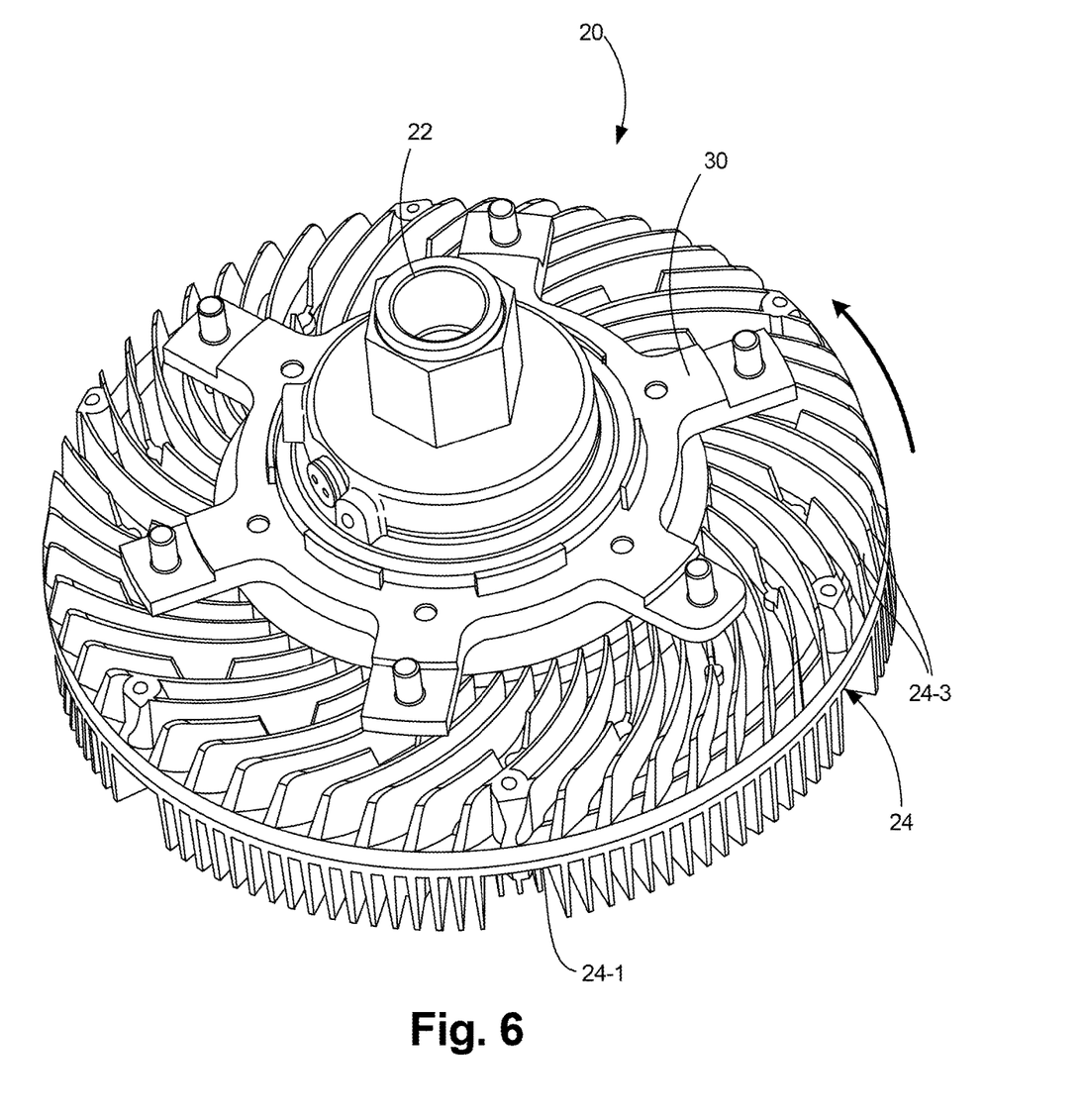
FIG. 6 is a rear perspective view of another embodiment of a viscous clutch according to the present invention.

FIG. 6 is a rear perspective view of another embodiment of a viscous clutch 20'. The viscous clutch 20' can be configured similarly to the clutch 20 described above. However, as shown in FIG. 6, the clutch 20' can include curved cooling fins 24-3' on the exterior of the housing 24. The curved cooling fins 24-3' can be backwards curved in relation to a direction of rotation of the housing 24 (which is counterclockwise as shown from the rear of the clutch 20' in FIG. 6). Because the housing 24 (and the shaft 22) can act as the input to the clutch 20', and rotates at input speed whenever there is a torque input, the cooling fins 24-3' pump more air and thus the clutch 20' consumes power than in prior art clutches that have a rotor input and a housing output with housing fins that rotate at an often slower output speed (or not at all when the clutch is disengaged). The backwards curve of the cooling fins 24-3' helps to reduce pumping loss while maintaining a relatively large surface area for heat rejection. Such a configuration is unusual in that cooling fins on clutches are sometimes forward curved to increase a "scooping" effect and increase air pumping, while the clutch 20' can provide effective cooling without incurring the pumping losses (and associated increased power consumption) typically associated with forward curved fins. Although only the cooling fins 24-3' on the base 24-1 are clearly visible in FIG. 6, the curved cooling fins 24-3' can also be provided on the cover 24-2.

The clutch configuration described above provides numerous benefits and advantages. For instance, the clutch provides additional airflow across the clutch compared to prior art clutch designs with the cooling fins on an output member that rotates only at the output or slip speed (which can be much less that the input speed). The location of the reservoir on the housing, an external part of the clutch, also provides a lower thermal resistance path for heat to be dissipated to ambient air than with prior art clutches having reservoirs located on a rotor or other interior component of the clutch. Placing the fluid reservoir on a component rotating at input speed maintains the benefits of relatively fast shear fluid release to the working chamber. Furthermore, the flux circuit configuration allows for mostly or entirely radial air gaps, while still providing a relatively efficient and compact flux path operable by a relative small electromagnet (e.g., electromagnetic coil). Furthermore, the valve assembly of the present clutch can provide debris protection to moving parts like the armature. The use of relatively few bearing sets can also help reduce possible failure points. And additionally, the clutch can be relatively compact and have a relatively low mass.

Discussion of Possible Embodiments

The following are non-exclusive descriptions of possible embodiments of the present invention.

A viscous clutch including a rotor; a housing that at least partially surrounds the rotor; a center shaft rotationally fixed to the housing; a mounting disk rotationally fixed to the rotor, wherein at least a portion of the mounting disk extends outside the housing; a working chamber defined between the rotor and the housing; a reservoir for holding a supply of a shear fluid; an electromagnet; a valve assembly to selectively control flow of the shear fluid between the reservoir and the working chamber, the valve assembly including an armature that is selectively movable in response to magnetic flux generated by the electromagnet, wherein the magnetic flux is transmitted between the armature and the electromagnet along a flux circuit; and a flux guide operatively positioned between the electromagnet and the armature, wherein the flux guide extends through the mounting disk.

The viscous clutch of the preceding paragraph can optionally include, additionally and/or alternatively, any one or more of the following features, configurations and/or additional components:

a hub rotationally fixed to both the rotor and the mounting disk;

the hub can comprise a magnetic flux conducting material, and the flux circuit of the valve assembly can pass through the hub;

the center shaft can extend axially from a rear face of the housing, and the mounting disk can encircle the center shaft adjacent to the rear face of the housing;

the center shaft can be coupled to the housing by a direct torque transmission path that passes through an central opening in the rotor and is spaced from the working chamber;

the mounting disk can be arranged substantially parallel to the rotor;

the mounting disk can include a plurality of radially-extending arms with attachment features configured such that an output device is attachable to the arms with openings to allow airflow through a center of the output device and between adjacent arms;

the reservoir can be carried by the housing;

a barrier forming a debris shield adjacent to the armature of the valve assembly;

an accumulator chamber configured to limit drain-back of the shear fluid from the reservoir to the working chamber;

the valve assembly can further include: a valve element configured to pivot as a function of movement of the armature, and the valve element can be mechanically biased to a default position, and the valve element can be configured to selectively cover and uncovers an outlet bore of the reservoir;

the flux guide can include an annular portion and a plurality of axially-projecting tabs;

the flux guide can be rotationally fixed to the mounting disk; and/or cooling fins located on an exterior of the housing, and the cooling fins can have a backwards curved shape in relation to a direction of rotation of the housing.

A viscous clutch assembly includes a rotor; a housing that at least partially surrounds the rotor; a center shaft rotationally fixed to the housing; a mounting disk rotationally fixed to the rotor, wherein at least a portion of the mounting disk extends outside the housing; a hub rotationally fixed to both the rotor and the mounting disk; a bearing set rotatably supporting the hub on the center shaft; a working chamber defined between the rotor and the housing; a reservoir for holding a supply of a shear fluid; an electromagnetic coil; a valve assembly to selectively control flow of the shear fluid between the reservoir and the working chamber, the valve assembly including an armature that is selectively movable in response to magnetic flux generated by the electromagnetic coil, wherein the magnetic flux is transmitted between the electromagnetic coil and the armature along a flux circuit, wherein the flux circuit is configured to travel through a magnetic flux-conductive portion of the hub that axially traverses the mounting disk.

The viscous clutch assembly of the preceding paragraph can optionally include, additionally and/or alternatively, any one or more of the following features, configurations and/or additional components:

a flux guide extending between the electromagnetic coil and the armature, and the flux guide can pass axially through the mounting disk;

the bearing set can be in direct contact with both the hub and the mounting disk;

the center shaft can extend axially outward from a rear face of the housing;

the mounting disk can encircle the center shaft adjacent to the rear face of the housing;

the center shaft can pass axially through at least a portion of the hub;

the center shaft can be affixed to the housing at a front face of the housing;

the mounting disk can be arranged substantially parallel to the rotor; the reservoir can be carried by the housing;

an accumulator chamber configured to limit drain-back of the shear fluid from the reservoir to the working chamber;

the bearing set can be located radially inward from the flux circuit; and/or the mounting disk can be positioned in between the housing and the electromagnetic coil.

A method for use with a viscous clutch includes delivering a torque input to a center shaft of the viscous clutch, wherein the torque input rotates a housing affixed to the center shaft; energizing an electromagnet to actuate a valve assembly that governs a volume of the shear fluid present in a working chamber within the viscous clutch; transmitting magnetic flux between the electromagnet and the valve assembly along a flux circuit; transmitting torque to an output rotor as a function of the volume of the shear fluid present in the working chamber; rotating a mounting disk rotationally fixed to the output rotor by way of a hub when torque is transmitted to the output rotor, wherein at least a portion of the mounting disk is located outside the housing; and passing the magnetic flux axially across the mounting disk as the magnetic flux is transmitted along the flux circuit.

The method of the preceding paragraph can optionally include, additionally and/or alternatively, any one or more of the following features, configurations and/or additional steps:

the magnetic flux can be passed axially across the mounting disk through a flux guide insert that passes through the mounting disk; and/or the magnetic flux can be passed axially across the mounting disk through a magnetic flux-conducting portion of the hub.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For instance, features of any given embodiment can generally be utilized with any other embodiment, as desired for particular applications, or utilized in isolation.

The invention claimed is:

1. A viscous clutch comprising:
   a rotor;
   a housing that at least partially surrounds the rotor;
   a center shaft rotationally fixed to the housing;
   a mounting disk rotationally fixed to the rotor, wherein at least a portion of the mounting disk extends outside the housing;
   a working chamber defined between the rotor and the housing;
   a reservoir for holding a supply of a shear fluid;
   an electromagnet;
   a valve assembly to selectively control flow of the shear fluid between the reservoir and the working chamber, the valve assembly including an armature that is selectively movable in response to magnetic flux generated by the electromagnet, wherein the magnetic flux is transmitted between the armature and the electromagnet along a flux circuit; and
   a flux guide operatively positioned between the electromagnet and the armature, wherein the flux guide extends through the mounting disk.

2. The viscous clutch of claim 1 and further comprising:
   a hub rotationally fixed to both the rotor and the mounting disk.

3. The viscous clutch of claim 2, wherein the hub comprises a magnetic flux conducting material, and wherein the flux circuit of the valve assembly passes through the hub.

4. The viscous clutch of claim 1, wherein the center shaft extends axially from a rear face of the housing, and wherein the mounting disk encircles the center shaft adjacent to the rear face of the housing.

5. The viscous clutch of claim 4, wherein the center shaft is coupled to the housing by a direct torque transmission path that passes through a central opening in the rotor and is spaced from the working chamber.

6. The viscous clutch of claim 1, wherein the mounting disk is arranged substantially parallel to the rotor.

7. The viscous clutch of claim 1, wherein the mounting disk includes a plurality of radially-extending arms with attachment features configured such that an output device is attachable to the arms with openings to allow airflow through a center of the output device and between adjacent arms.

8. The viscous clutch of claim 1, wherein the reservoir is carried by the housing.

9. The viscous clutch of claim 1 and further comprising:
   a barrier forming a debris shield adjacent to the armature of the valve assembly.

10. The viscous clutch of claim 1 and further comprising:
    an accumulator chamber configured to limit drain-back of the shear fluid from the reservoir to the working chamber.

11. The viscous clutch of claim 1, wherein the valve assembly further comprises:
    a valve element configured to pivot as a function of movement of the armature, wherein the valve element is mechanically biased to a default position, and wherein the valve element selectively covers and uncovers an outlet bore of the reservoir.

12. The viscous clutch of claim 1, wherein the flux guide includes an annular portion and a plurality of axially-projecting tabs, and wherein the flux guide is rotationally fixed to the mounting disk.

13. The viscous clutch of claim 1 and further comprising:
    cooling fins located on an exterior of the housing, wherein the cooling fins have a backwards curved shape in relation to a direction of rotation of the housing.

14. A viscous clutch assembly comprising:
    a rotor;

a housing that at least partially surrounds the rotor;
a center shaft rotationally fixed to the housing;
a mounting disk rotationally fixed to the rotor, wherein at least a portion of the mounting disk extends outside the housing;
a hub rotationally fixed to both the rotor and the mounting disk;
a bearing set rotatably supporting the hub on the center shaft;
a working chamber defined between the rotor and the housing;
a reservoir for holding a supply of a shear fluid;
an electromagnetic coil;
a valve assembly to selectively control flow of the shear fluid between the reservoir and the working chamber, the valve assembly including an armature that is selectively movable in response to magnetic flux generated by the electromagnetic coil, wherein the magnetic flux is transmitted between the electromagnetic coil and the armature along a flux circuit, wherein the flux circuit is configured to travel through a magnetic flux-conductive portion of the hub that axially traverses the mounting disk.

15. The assembly of claim 14 and further comprising:
a flux guide extending between the electromagnetic coil and the armature, wherein the flux guide passes axially through the mounting disk.

16. The assembly of claim 14, wherein the bearing set is in direct contact with both the hub and the mounting disk.

17. The assembly of claim 14, wherein the center shaft extends axially outward from a rear face of the housing, and wherein the mounting disk encircles the center shaft adjacent to the rear face of the housing.

18. The assembly of claim 17, wherein the center shaft passes axially through at least a portion of the hub, and wherein the center shaft is affixed to the housing at a front face of the housing.

19. The assembly of claim 14, wherein the mounting disk is arranged substantially parallel to the rotor.

20. The assembly of claim 14, wherein the reservoir is carried by the housing.

21. The assembly of claim 14 and further comprising:
an accumulator chamber configured to limit drain-back of the shear fluid from the reservoir to the working chamber.

22. The assembly of claim 14, wherein the bearing set is located radially inward from the flux circuit.

23. The assembly of claim 14, wherein the mounting disk is positioned in between the housing and the electromagnetic coil.

24. A method for use with a viscous clutch, the method comprising:
delivering a torque input to a center shaft of the viscous clutch, wherein the torque input rotates a housing affixed to the center shaft;
energizing an electromagnet to actuate a valve assembly that governs a volume of the shear fluid present in a working chamber within the viscous clutch;
transmitting magnetic flux between the electromagnet and the valve assembly along a flux circuit;
transmitting torque to an output rotor as a function of the volume of the shear fluid present in the working chamber;
rotating a mounting disk rotationally fixed to the output rotor by way of a hub when torque is transmitted to the output rotor, wherein at least a portion of the mounting disk is located outside the housing; and
passing the magnetic flux axially across the mounting disk as the magnetic flux is transmitted along the flux circuit.

25. The method of claim 24, wherein the magnetic flux is passed axially across the mounting disk through a flux guide insert that passes through the mounting disk.

26. The method of claim 24, wherein the magnetic flux is passed axially across the mounting disk through a magnetic flux-conducting portion of the hub.

* * * * *